United States Patent
Chen et al.

(10) Patent No.: US 9,799,289 B2
(45) Date of Patent: Oct. 24, 2017

(54) LIQUID CRYSTAL PANELS AND VOLTAGE ADJUSTING METHODS

(71) Applicant: Shenzhen China Star Optoelectronics Technology Co., Ltd., Shenzhen, Guangdong (CN)

(72) Inventors: Yu-Yeh Chen, Guangdong (CN); Yu Wu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 86 days.

(21) Appl. No.: 14/909,097

(22) PCT Filed: Jul. 31, 2015

(86) PCT No.: PCT/CN2015/085694
§ 371 (c)(1),
(2) Date: Jan. 29, 2016

(87) PCT Pub. No.: WO2017/012137
PCT Pub. Date: Jan. 26, 2017

(65) Prior Publication Data
US 2017/0162144 A1    Jun. 8, 2017

(30) Foreign Application Priority Data
Jul. 20, 2015    (CN) .......................... 2015 1 0427290

(51) Int. Cl.
G09G 3/36    (2006.01)
G02F 1/1368    (2006.01)
(Continued)

(52) U.S. Cl.
CPC ......... *G09G 3/3648* (2013.01); *G02F 1/1368* (2013.01); *G02F 1/13624* (2013.01);
(Continued)

(58) Field of Classification Search
CPC ............... G09G 3/3648; G09G 3/3685; G09G 2320/029; G09G 2320/0295
See application file for complete search history.

(56) References Cited

U.S. PATENT DOCUMENTS 7,655,917 B2 *    2/2010    Iwakiri ..................... G01T 1/24
                                                     250/370.09
7,932,500 B2 *    4/2011    Iwakiri ................. G01T 1/2928
                                                     250/370.07
(Continued)

*Primary Examiner* — Gene W Lee
(74) *Attorney, Agent, or Firm* — Andrew C. Cheng

(57) ABSTRACT

The present invention discloses a liquid crystal panel and a voltage adjusting method. The liquid crystal panel includes a display area and a non-display area. The display area includes a plurality of TFTs for driving the sub-pixels connected with the TFTs to display images. The non-display area is an area having a predetermined dimension configured along a rim of the display area. The non-display area includes a predetermined number of TFTs, a predetermined number of data lines along a vertical direction, a target gate line extending from at least one gate line within the display area along a horizontal direction, wherein each of the data lines connects to one TFT. Each of the target gate line connects to at least one TFT, and each of the data lines is configured for detecting leakage current of the TFTs connected with the data line.

12 Claims, 6 Drawing Sheets

(51) Int. Cl.
*G02F 1/1362* (2006.01)
*G02F 1/1343* (2006.01)

(52) U.S. Cl.
CPC .. *G02F 1/134309* (2013.01); *G02F 1/136286* (2013.01); *G02F 2001/134345* (2013.01); *G02F 2001/136254* (2013.01); *G02F 2201/121* (2013.01); *G09G 2320/0214* (2013.01); *G09G 2330/12* (2013.01)

(56) References Cited

U.S. PATENT DOCUMENTS

| | | | |
|---|---|---|---|
| 8,288,732 B2* | 10/2012 | Okada | G03B 42/04 250/370.09 |
| 9,606,645 B2* | 3/2017 | Lin et al. | G06F 3/038 |
| 2008/0136743 A1* | 6/2008 | Okada | G03B 42/04 345/55 |
| 2008/0237479 A1* | 10/2008 | Iwakiri | G01T 1/2928 250/370.08 |
| 2008/0237508 A1* | 10/2008 | Iwakiri | G01T 1/24 250/591 |
| 2014/0368446 A1* | 12/2014 | Chang et al. | G06F 3/0412 345/173 |
| 2015/0070608 A1* | 3/2015 | Yoon et al. | G09G 3/3655 349/33 |
| 2015/0194094 A1* | 7/2015 | Lin et al. | G06F 3/038 345/698 |

* cited by examiner

LIQUID CRYSTAL PANELS AND VOLTAGE ADJUSTING METHODS

CROSS REFERENCE

This application claims the priority of Chinese Patent Application No. 201510427290.2, entitled "Liquid crystal panels and voltage adjusting methods", filed on Jul. 20, 2015, the disclosure of which is incorporated herein by reference in its entirety.

FIELD OF THE INVENTION

The present invention relates to a display technology field, and more particularly to a liquid crystal panel and a voltage adjusting method.

BACKGROUND OF THE INVENTION

With respect to thin film transistor (TFTs) liquid crystal panel, each of the pixels are driven by the TFTs behind the pixels. Thus, the TFT liquid crystal panels are characterized by attributes such as high speed, high brightness, and high contrastness, and thus are very popular for consumers. However, in real scenarios, as the electrical leakage may happen when the TFT is turned off, the pixel voltage of the pixels may be shifted. That is, the voltage of positive/negative polarity may not be symmetrical with respect to the common voltage. The ions may be captured to form an internal electrical field, and thus the electrical fields applied to the pixels may be overlapped, which may cause the residuals leading to bad display performance.

SUMMARY OF THE INVENTION

The technical issue that the embodiment of the present disclosure solves is to provide a liquid crystal panel and a voltage adjusting method to enhance the display performance of TFT liquid crystal panel.

In one aspect, a liquid crystal panel includes: a display area and a non-display area, wherein: the display area includes a plurality of thin film transistors (TFTs) for driving the sub-pixels connected with the TFTs to display images; the non-display area is an area having a predetermined dimension configured along a rim of the display area, the non-display area includes a predetermined number of TFTs, a predetermined number of data lines along a vertical direction, a target gate line extending from at least one gate line within the display area along a horizontal direction, wherein each of the data lines connects to one TFT, each of the target gate line connects to at least one TFT, each of the data lines is configured for detecting leakage current of the TFTs connected with the data line, the detected leakage current represents characteristics of the leakage current of the TFTs within the display area, structures of the TFTs within the non-display area are the same with the structures of the TFTs within the display area, and each of the TFTs within the non-display area connects to one sub-pixel.

In another aspect, a voltage adjusting method for liquid crystal panels includes: detecting whether TFTs within a display area are turned off; detecting leakage current from each of the TFTs upon determining the TFTs are turned off; determining a target voltage in accordance with the detected leakage current; and adjusting a common voltage of a first plate of a liquid crystal capacitor within the display area to be the target voltage.

In view of the above, the liquid crystal panel detects whether the TFTs within the non-display area are turned off. If yes, the liquid crystal panel detects the leakage current from each of the TFTs. Further, the target voltage is determined in accordance with the detected leakage current. Afterward, the liquid crystal panel adjusts the common voltage of the first plate of the liquid crystal capacitor within the display area to be the target voltage. When the liquid crystal molecules switch continuously between the positive and negative pole, the difference between the common voltage of the first plate of the liquid crystal capacitor and the pixel voltage of the second plate remains the same, such that the liquid crystal molecules are electrically neutrality. The ions are prevented from being captured, and thus the residuals issues may be avoided.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

The present disclosure relates to a liquid crystal panel and a voltage adjusting method to enhance the display performance of TFT liquid crystal panel.

In the embodiment, the liquid crystal panel may include the liquid crystal panel incorporated with the TFTs. The liquid crystal panel may be applied to any desired configuration of the display device, which may include, but are not limited to television, smart phone, notebook computers, personal computers (PC), personal digital assistants (PDA), mobile Internet devices (MID), intelligent wearable devices (such as smart watches, smart bracelet), etc., and thus is not limited to the embodiments.

Figure 1:
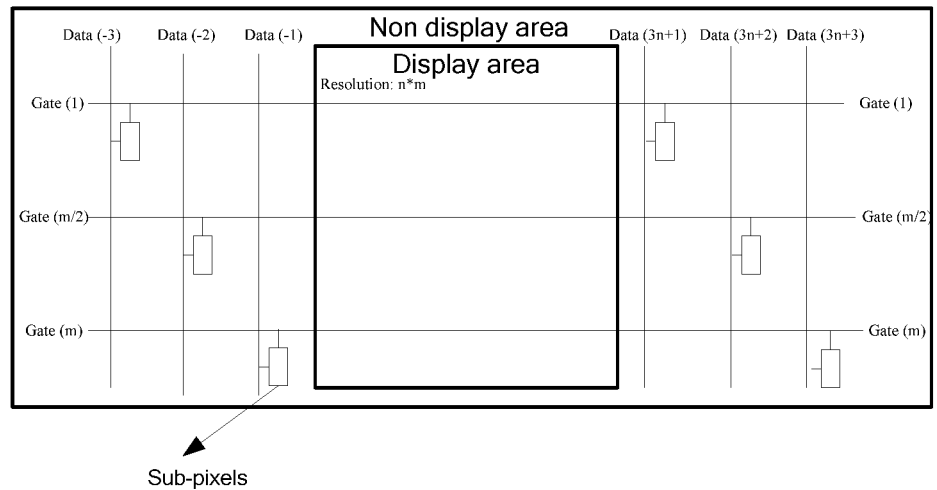
FIG. 1 is a schematic view of the liquid crystal panel in accordance with one embodiment.

FIG. 1 is a schematic view of the liquid crystal panel in accordance with one embodiment. As shown in FIG. 1, the liquid crystal panel includes a display area and a non-display area.

The display area includes a plurality of TFTs for driving the sub-pixels connected with the TFTs so as to display images.

The non-display area is an area having a predetermined dimension configured along a rim of the display area. The non-display area includes a predetermined number of TFTs, a predetermined number of data lines along a vertical direction, a target gate line extending from at least one gate line within the display area along a horizontal direction. Wherein each of the data lines connects to one TFT, each of the target gate line connects to at least one TFT, each of the data lines is configured for detecting leakage current of the TFTs connected with the data line. The detected leakage current represents the leakage current of the TFTs within the display area. The structure of the TFTs within the non-display area is the same with that of the TFTs within the display area. Each of the TFTs within the non-display area connects to one sub-pixel, In the embodiment, the number of TFTs, i.e., the predetermined number of TFTs, within the non-display area may be determined by the image flicker within the display area. The number is shown as six in FIG. 1. When the predetermined number of the TFTs in the non-display area is determined, the data lines of predetermined numbers have to be configured within the non-display area. Each of the data lines connects to only one TFT, which ensures that the leakage current of the TFTs may be completely detected within one frame. The target get line within the non-display area may be at least one gate line within the display area extends leftward or rightward to the non-display area, or may be at least one gate line within the display area extends toward two lateral ends to the non-display area. Each of the target gate lines connects to at least one TFT. As shown in FIG. 1, the non-display area includes six TFTs, six data lines, and three gate lines. The three gate lines are obtained by extending the three gate lines, i.e., the first gate line, the (m/2)-th gate line, and the m-th gate line from the display area toward the non-display area. The TFT may be arranged in an upper-left area, an upper-right area, a middle-left area, a middle-right area, a left-bottom area, and a right-bottom area.

In the embodiment, each of the data lines within the non-display area is configured for detecting the leakage current of the TFT connected with the data line. The detected leakage current represents the leakage current of the TFTs within the display area. In order to enhance the precision, the structure of the TFTs within the non-display area is the same with that of the TFTs within the display area. Each of the TFTs within the non-display area connects to one sub-pixel, wherein each of the pixels includes three sub-pixels, i.e., the red, green, and the blue sub-pixels.

Specifically, the data lines within the non-display area are configured for filling the voltage when the TFT connected with the data line is turned on, and for detecting the change of the leakage current when the TFT connected with the data line is turned off, wherein the leakage current relates to the leakage current flowed out when the TFT connected with the data line is turned off.

It is to be noted that number of the TFTs within the non-display area of FIG. 1 is not limited to six. The locations of the TFTs are not limited to the configuration in FIG. 1. That is, the locations of the TFTs may be configured in accordance with real scenarios. The more the number of the TFTs in the non-display area, the higher the precision of the detected leakage current of the TFT within the non-display area. However, the dimension within the non-display area occupied by the TFTs is larger, that is, the border may be wider. Thus, the number of TFTs within the non-display area may be configured in accordance with real scenarios.

Figure 2:
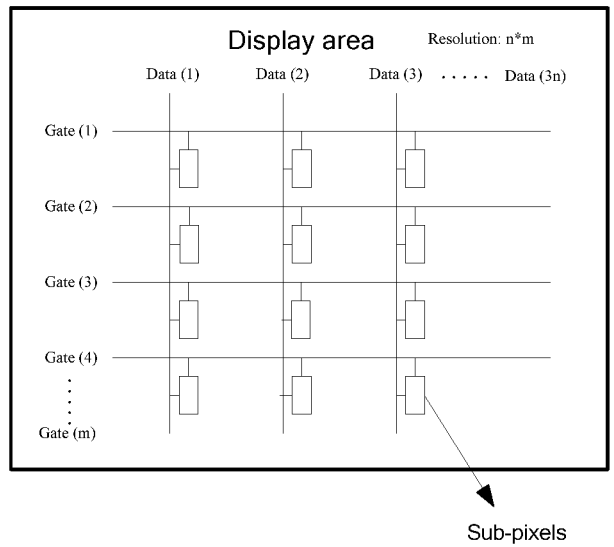
FIG. 2 is a schematic view of the display area of the liquid crystal panel in accordance with one embodiment.

FIG. 2 is a schematic view of the display area of the liquid crystal panel in accordance with one embodiment. As shown in FIG. 2, when the resolution of the display area is n*m, the display area is divided to 3n*m sub-areas defined by 3n number of data lines along the vertical direction and m number of gate lines along the horizontal direction, wherein each of the sub-area includes one sub-pixel. The display area includes a plurality of TFTs connected by the data lines and connected by the gate lines.

In the embodiment, when the display area is of the n*m resolution, the display area includes 3n*m number of sub-pixels, and each of the sub-pixels is driven by the TFTs integrated behind the sub-pixels. Thus, the display area includes 3n*m number of TFTs. At the same time, the display area includes 3n number of data line and m number of gate lines. The data lines and the gate lines divide the display area into 3n*m number of sub-areas, and each of the sub-areas include one sub-pixel. The display area includes a plurality of TFTs connected by the data lines and connected by the gate lines.

Figure 3:
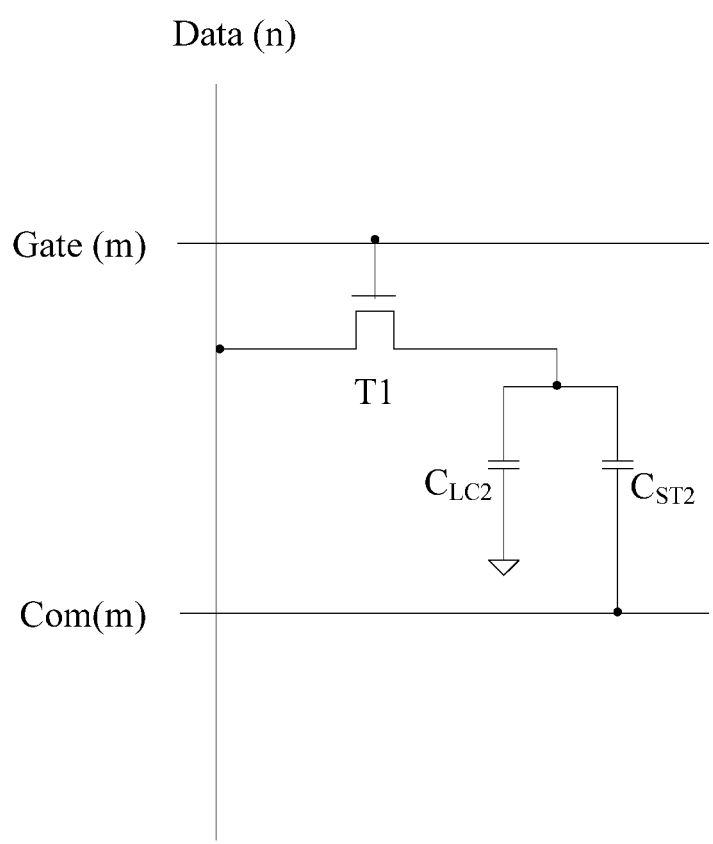
FIG. 3 is a schematic view of the equivalent circuit of the sub-pixels in accordance with one embodiment.

FIG. 3 is a schematic view of the equivalent circuit of the sub-pixels in accordance with one embodiment. As shown in FIG. 3, the equivalent circuit includes a TFT, a liquid crystal capacitor, and a storage capacitor.

The gate of the TFTs within the non-display area and the display area connects to the gate line, the source of the TFTs within the non-display area and the display area connects to the data line, and the drain of the TFTs within the non-display area and the display area connects to a first plate of the liquid crystal capacitor, the drain of the TFTs within the non-display area and the display area connects to a first plate of the storage capacitor, and second plates of the liquid crystal capacitor and of the storage capacitor are respectively connects to the common electrode.

In the embodiment, the structure of the TFTs within the non-display area is the same with that of the TFTs within the display area. Each of the TFTs within the non-display area connects to one sub-pixel. In this way, the equivalent circuit of the sub-pixels within the non-display area is the same with that of the sub-pixels within the display area. Thus, the leakage current of the TFT within the non-display area may be similar to that of the TFT within the display area.

When the T1, i.e., the TFT, is turned on, the data on the data line may be written to the liquid crystal capacitor ($C_{LC2}$). When the T1 is turned off, the liquid crystal capacitor ($C_{LC2}$) maintains the voltage of each of the pixels. At the same time, the leakage current on the T1 may be flow reversely into the data line connected with the T1.

The principles of the liquid crystal panel may be described in detail with reference to FIGS. 1-3.

In the embodiment, the liquid crystal panel detects whether the TFTs within the non-display area is turned off. Upon detecting the TFT is turned off, the data line connected with the TFT detects the leakage current from the TFT. Further, a target voltage is determined in accordance with the leakage current. The liquid crystal panel may adjust the common voltage of the first plate of the liquid crystal capacitor within the display area to be the target voltage.

Specifically, the liquid crystal panel may detect the leakage current. The voltage corresponding to each of the leakage current may be obtained by the pre-saved relationship between the leakage current and the voltage. The obtained voltage is summed up and then an average value is calculated, which may be the target voltage. Alternatively, the liquid crystal panel may sum up the detected leakage current and calculate the average value so as to obtain the average leakage current. After obtaining the target voltage, the liquid crystal panel adjusts the common voltage of the first plate of each of the liquid crystal capacitor within the display area to be the target voltage.

Alternatively, the liquid crystal panel obtains the target voltage corresponding to each of the leakage current in view of the pre-saved relationship between the leakage current and the voltage in accordance to the detected leakage current. Further, according to the pre-saved relationship between the sub-areas and the TFTs, the target voltage of each of the sub-areas of the display area may be determined. The target voltage of the sub-areas is the target voltage corresponding to the leakage current from the TFT corresponding to the sub-area. In addition, the common voltage of the first plate of the liquid crystal capacitor of each of the sub-areas is adjusted to be the target voltage of the sub-area.

In the embodiment, after the common voltage of the first plate of the liquid crystal capacitor of each of the sub-areas is adjusted to be the target voltage of the sub-area, the liquid crystal molecules switch continuously between the positive and negative poles. As such, the difference between the common voltage of the first plate of the liquid crystal capacitor and the pixel voltage of the second plate remains the same, and the liquid crystal molecules are electrically neutrality. The ions are prevented from being captured, and thus the residuals issues may be avoided.

It is to be noted that "the common voltage of the first plate of the liquid crystal capacitor" relates to the common voltage of the second plate of the liquid crystal capacitor connected with the common electrode, and "the pixel voltage of the second plate" relates to the pixel voltage of the first plate connected with the drain of the TFT.

Figure 4:
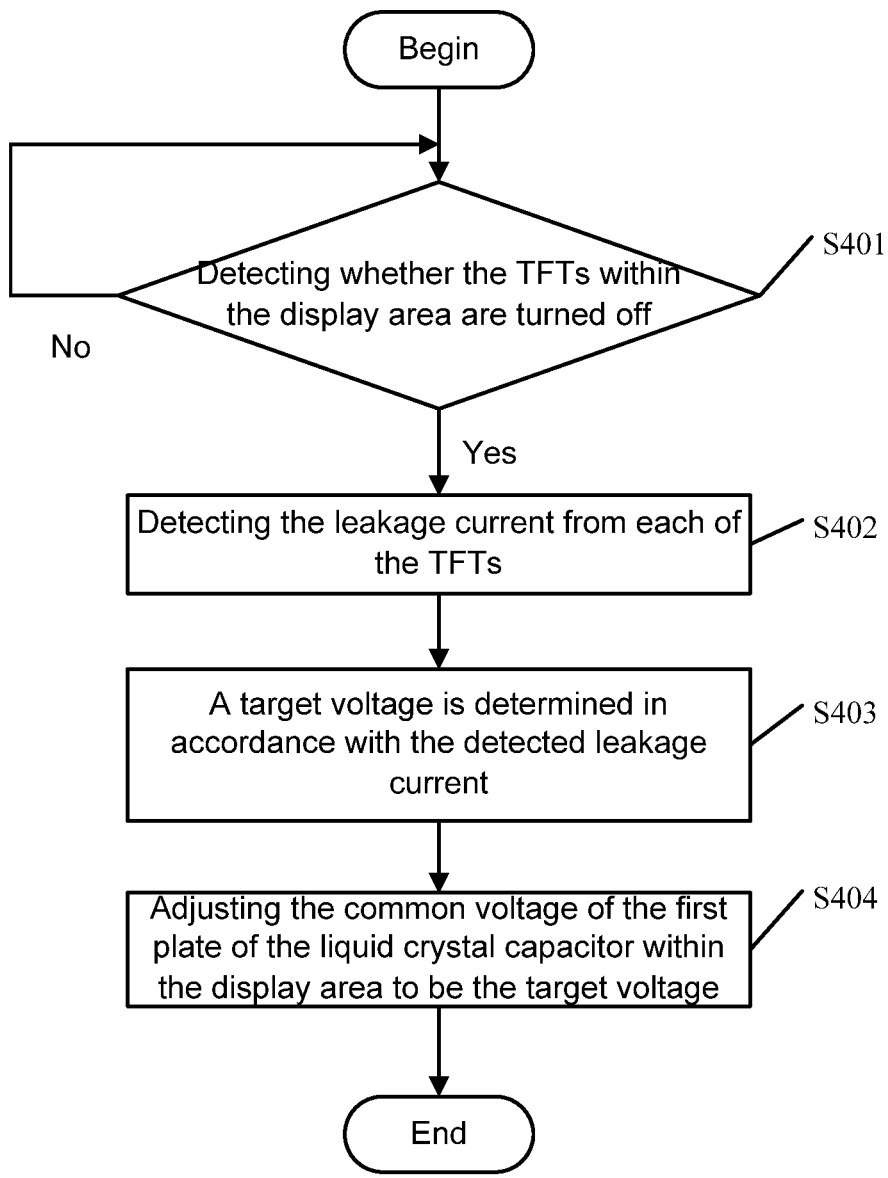
FIG. 4 is a flowchart of the voltage adjusting method in accordance with one embodiment.

FIG. 4 is a flowchart of the voltage adjusting method in accordance with one embodiment. The method includes the following steps.

In step S401, detecting whether the TFTs within the display area are turned off. If yes, the process goes to step S402, otherwise, the process goes back to step S401.

In the embodiment, each of the pixels are driven by the TFTs behind the pixels. Thus, the TFT liquid crystal panels are characterized by attributes such as high speed, high brightness, and high contrastness, and thus are very popular for consumers.

Usually, the TFTs have two operations state, an on state and an off state. When the TFT is in the on state, the liquid crystal capacitor is quickly charged. When the TFT is in the off state, the voltage of the liquid crystal capacitor remains the same.

When the data is written to one column, the TFT is turned off, theoretically, the pixel voltage of the liquid crystal capacitor remains for a period of time, i.e., one frame. However, as the electrical leakage may happen when the TFT is turned off, the pixel voltage of the pixels may be shifted. That is, the voltage of positive/negative polarity may not be symmetrical with respect to the common voltage. The liquid crystal molecules switch continuously between the positive and negative poles, and the voltage having the positive/negative polarity applied to two ends of the liquid crystal panel is not equivalent, such that the ions may be captured to form an internal electrical field, and thus the electrical fields applied to the pixels may be overlapped, which may cause the residuals.

In the embodiment, when the TFT within the display area is turned off, the leakage current may be flow reversely into the data line connected. As the data line transmits the voltage for most of the time, within one frame, and thus the data line may not independently to operate as a path to detect the leakage current.

In the embodiment, the TFTs are arranged within the non-display area in advance. The structure of the TFTs within the non-display area is the same with that of the TFTs within the display area. Each of the data lines within the non-display area connects to only one TFT, and the data line connects to the source IC. The voltage is filled only during the scanning time period, and the rest of time is for detecting the current on the data line. in this way, the TFT leakage current may be detected within one frame. It is to be noted that when the structure of the TFTs within the non-display area is the same with that of the TFTs within the display area, the leakage current characteristics of the TFTs within the display area may be reflected by detecting the leakage current of the TFT within the non-display area.

In step S402, detecting the leakage current from each of the TFTs.

In the embodiment, when the TFTs in the non-display area are turned off, the liquid crystal panel may detect the leakage current from each of the TFTs.

Specifically, a corresponding channel may be configured on the source IC for driving the TFTs in the non-display area and for detecting the leakage current from the TFTs within the non-display area.

In step S403, a target voltage is determined in accordance with the detected leakage current.

In the embodiment, after detecting the leakage current from each of the TFTs, the liquid crystal panel determines the target voltage in accordance with the detected leakage current.

In one embodiment, the step of detecting the leakage current and determining the target voltage may include the following steps:

(11) Querying a corresponding voltage of each of the leakage current via a pre-saved relationship of the leakage current and the voltage according to the detected leakage current;

(12) Summing up the voltage to obtain an average value to be the target voltage.

In the embodiment, the relationship between the leakage current and the voltage may be obtained by experiments. After detecting the leakage current from each of the TFTs, the voltage corresponding to the leakage current may be obtained by querying the relationship. Further, the voltages are summed up and the averaged value is calculated, which is the target voltage.

In another embodiment, the step of detecting the leakage current and determining the target voltage may include the following steps:

(21) Summing up the leakage current to obtain an average value;

(22) According to the average leakage current, the target voltage corresponding to the average leakage current may be obtained by querying the pre-saved relationship between the leakage current and the voltage.

In the embodiment, the relationship between the leakage current and the voltage may be obtained by experiments. After detecting the leakage current from each of the TFTs, the target voltage corresponding to the averaged leakage current may be obtained by querying the relationship. Further, the voltages are summed up and the averaged value is calculated, which is the target voltage.

In step S404, adjusting the common voltage of the first plate of the liquid crystal capacitor within the display area to be the target voltage.

In the embodiment, after the TFT is turned off, the leakage current may cause the pixel voltage on the liquid crystal capacitor to be shifted. Thus, in order to keep the liquid crystal molecules neutral, the difference between the two plates of the liquid crystal capacitor has to be a fixed value. That is, the difference between the pixel voltage of the liquid crystal capacitor and the VCOM has to be the fixed value. The only solution is to adjust the VCOM of the liquid crystal capacitor. Thus, the ions are prevented from being captured, and thus the residuals issues may be avoided.

In the embodiment, after the common voltage of the first plate of the liquid crystal capacitor within the display area is adjusted to be the target voltage, each of the liquid crystal molecules may be electrically neutral. In this way, the ions are prevented from being captured by the liquid crystal molecules. The liquid crystal capacitor includes a top plate and a down plate, which are respectively the first plate and the second plate. VCOM is loaded on the first plate, and the pixel voltage is loaded on the second plate.

It is to be noted that "the first plate of the liquid crystal capacitor" relates to the second plate of the liquid crystal capacitor connected with the common electrode, and the "second plate" relates to the first plate connected with the drain of the TFT.

In view of the flowchart in FIG. 4, the liquid crystal panel detects whether the TFTs within the non-display area are turned off. If yes, the liquid crystal panel detects the leakage current from each of the TFTs. Further, the target voltage is determined in accordance with the detected leakage current. Afterward, the liquid crystal panel adjusts the common voltage of the first plate of the liquid crystal capacitor within the display area to be the target voltage. When the liquid crystal molecules switch continuously between the positive and negative pole, the difference between the common voltage of the first plate of the liquid crystal capacitor and the pixel voltage of the second plate remains the same, such that the liquid crystal molecules are electrically neutrality. The ions are prevented from being captured, and thus the residuals issues may be avoided.

Figure 5:
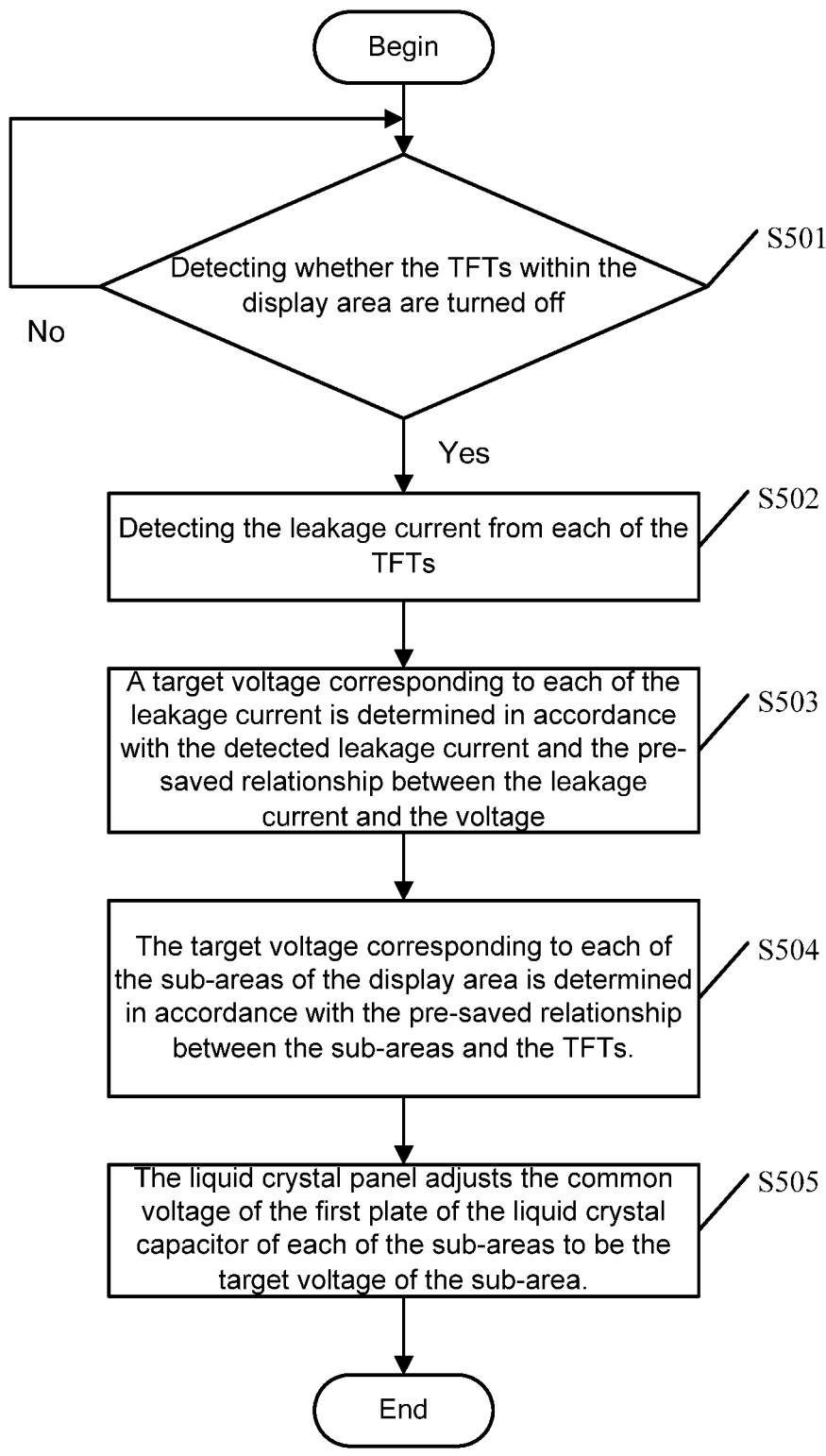
FIG. 5 is a flowchart of the voltage adjusting method in accordance with another embodiment.

FIG. 5 is a flowchart of the voltage adjusting method in accordance with another embodiment. The method includes the following steps.

In step S501, detecting whether the TFTs within the display area are turned off. If yes, the process goes to step S502, otherwise, the process goes back to step S501.

In step S502, detecting the leakage current from each of the TFTs.

In step S503, a target voltage corresponding to each of the leakage current is determined in accordance with the detected leakage current and the pre-saved relationship between the leakage current and the voltage.

In the embodiment, the relationship between the leakage current and the voltage is pre-saved in the liquid crystal panel, and the relationship may be obtained by experiments. After detecting the leakage current from each of the TFTs, the target voltage corresponding to each of the leakage current may be obtained in view of the relationship.

In step S504, the target voltage corresponding to each of the sub-areas of the display area is determined in accordance with the pre-saved relationship between the sub-areas and the TFTs.

In the embodiment, the display area of the liquid crystal panel is divided into a plurality of sub-areas. For instance, when the number of the TFTs within the non-display area is six, the display area may be divided into six sub-areas, 12 sub-areas, or 18 sub-areas, and the present disclosure is not limited thereto. Afterward, the relationship between each of the sub-areas and the TFTs may be created, and the relationship may be stored within the source IC of the liquid crystal panel.

In the embodiment, after obtaining the target voltage corresponding to the leakage current, the liquid crystal panel further determines the corresponding TFT of the sub-area.

The target voltage of each of the sub-area is the target voltage corresponding to the leakage current of the TFT corresponding to the sub-area.

In step S505, the liquid crystal panel adjusts the common voltage of the first plate of the liquid crystal capacitor of each of the sub-areas to be the target voltage of the sub-area.

In the embodiment, the liquid crystal panel divides the display area into a plurality of sub-areas and determines the target voltage with respect to each of the sub-areas. The liquid crystal panel adjusts the common voltage of the first plate of the liquid crystal capacitor within each of the sub-areas to be the target voltage of the sub-area.

In view of the flowchart in FIG. 5, the liquid crystal panel detects whether the TFTs within the non-display area are turned off, and detects the leakage current from each of the TFTs. The target voltage is determined in accordance with the detected leakage current and the pre-saved relationship between the leakage current and the voltage. Further, the target voltage of each of the sub-areas is determined in accordance with the relationship between the sub-areas and the TFTs, and the common voltage of the first plate of the liquid crystal capacitor within each of the sub-areas is adjusted to be the target voltage of the sub-area. When the liquid crystal molecules switch continuously between the positive and negative pole, the difference between the common voltage of the second plate of the liquid crystal capacitor and the pixel voltage of the second plate remains the same, such that the liquid crystal molecules are electrically neutrality. The ions are prevented from being captured, and thus the residuals issues may be avoided.

Figure 6:
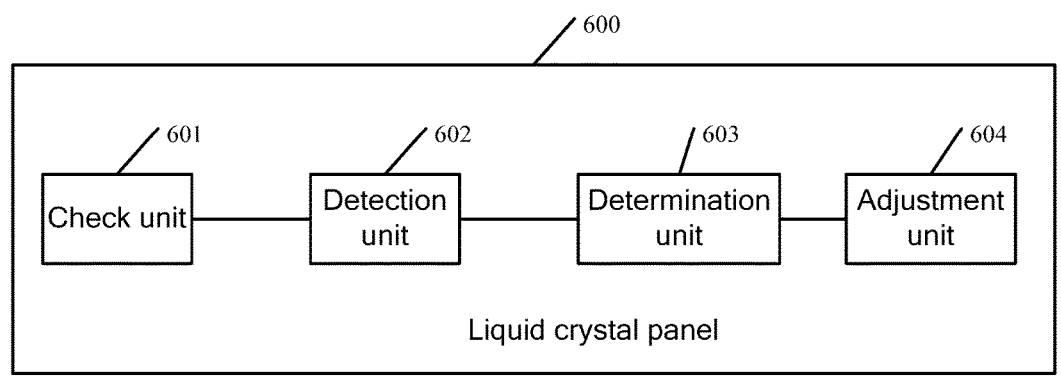
FIG. 6 is a schematic view of the liquid crystal panel in accordance with one embodiment.

FIG. 6 is a schematic view of the liquid crystal panel in accordance with one embodiment. The liquid crystal panel 600 includes a check unit 601, a detection unit 602, a determination unit 603, and an adjustment unit 604.

The check unit 601 is configured for determining whether the TFTs within the non-display area are turned off.

In the embodiment, each of the pixels are driven by the TFTs behind the pixels. Thus, the TFT liquid crystal panels are characterized by attributes such as high speed, high brightness, and high contrastness, and thus are very popular for consumers.

Usually, the TFTs have two operations state, an on state and an off state. When the TFT is in the on state, the liquid crystal capacitor is quickly charged. When the TFT is in the off state, the voltage of the liquid crystal capacitor remains the same.

When the data is written to one column, the TFT is turned off, theoretically, the pixel voltage of the liquid crystal capacitor remains for a period of time, i.e., one frame. However, as the electrical leakage may happen when the TFT is turned off, the pixel voltage of the pixels may be shifted. That is, the voltage of positive/negative polarity may not be symmetrical with respect to the common voltage. The liquid crystal molecules switch continuously between the positive and negative poles, and the voltage having the positive/negative polarity applied to two ends of the liquid crystal panel is not equivalent, such that the ions may be captured to form an internal electrical field, and thus the electrical fields applied to the pixels may be overlapped, which may cause the residuals.

In the embodiment, when the TFT within the display area is turned off, the leakage current may be flow reversely into the data line connected. As the data line transmits the voltage for most of the time, within one frame, and thus the data line may not independently to operate as a path to detect the leakage current.

In the embodiment, the TFTs are arranged within the non-display area in advance. The structure of the TFTs within the non-display area is the same with that of the TFTs within the display area. Each of the data lines within the non-display area connects to only one TFT, and the data line connects to the source IC. The voltage is filled only during the scanning time period, and the rest of time is for detecting the current on the data line. In this way, the TFT leakage current may be detected within one frame. It is to be noted that when the structure of the TFTs within the non-display area is the same with that of the TFTs within the display area, the leakage current characteristics of the TFTs within the display area may be reflected by detecting the leakage current of the TFT within the non-display area.

When the check unit 601 determines that the TFTs within the non-display area are turned off, the detection unit 602 is configured for detecting the leakage current from each of the TFTs.

In the embodiment, when the check unit 601 determines that the TFTs within the non-display area are turned off, the detection unit 602 detects the leakage current from each of the TFTs.

Specifically, a corresponding channel may be configured on the source IC for driving the TFTs in the non-display area and for detecting the leakage current from the TFTs within the non-display area.

The determination unit 603 is configured for determining the target voltage in accordance with the leakage current.

The adjustment unit 604 is configured for adjusting the common voltage of the first plate of the liquid crystal capacitor within the display area to be the target voltage.

In the embodiment, after the TFT is turned off, the leakage current may cause the pixel voltage on the liquid crystal capacitor to be shifted. Thus, in order to keep the liquid crystal molecules neutral, the difference between the two plates of the liquid crystal capacitor has to be a fixed value. At this moment, the only solution is to adjust the VCOM of the liquid crystal capacitor. Thus, the ions are prevented from being captured, and thus the residuals issues may be avoided.

In the embodiment, after the common voltage of the first plate of the liquid crystal capacitor within the display area is adjusted to be the target voltage, each of the liquid crystal molecules may be electrically neutral. In this way, the ions are prevented from being captured by the liquid crystal molecules. The liquid crystal capacitor includes a top plate and a down plate, which are respectively the first plate and the second plate. VCOM is loaded on the first plate, and the pixel voltage is loaded on the second plate.

Figure 7:
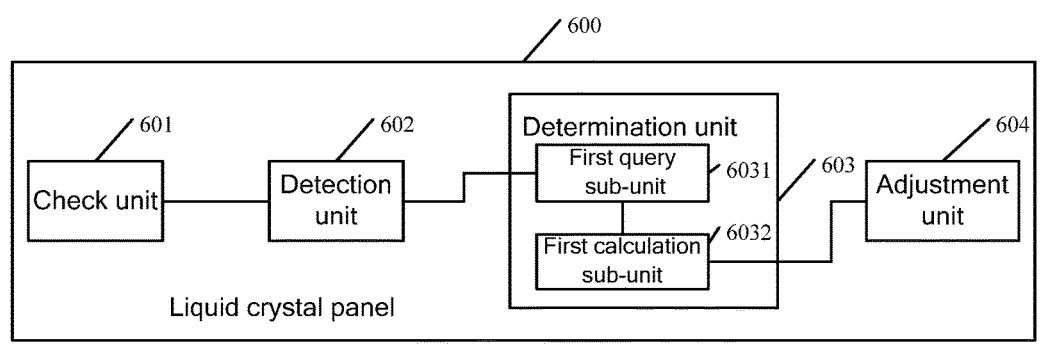
FIG. 7 is a schematic view of the liquid crystal panel in accordance with another embodiment.

FIG. 7 is a schematic view of the liquid crystal panel in accordance with another embodiment. The liquid crystal panel of FIG. 7 is enhanced on the basis of the liquid crystal panel of FIG. 6. Compared to the liquid crystal panel in FIG. 6, the liquid crystal panel in FIG. 7 further comprises a determination unit 603.

A first query sub-unit 6031 is configured for querying the voltage corresponding to each of the leakage current in accordance with the detected leakage current and the pre-saved relationship between the leakage current and the voltage.

A first calculation sub-unit 6032 is configured for summing up the queried voltages and to calculate an average voltage to be the target voltage.

In the embodiment, the relationship between the leakage current and the voltage is pre-saved in the liquid crystal panel, and the relationship may be obtained by experiments. The detection unit 602 detects the leakage current from the TFT, and the first query sub-unit 6031 further queries the voltage corresponding to each of the leakage current in accordance with the relationship between the leakage current and the voltage. Further, the first calculation sub-unit 6032 sums up the voltages and calculates the average value to be the target voltage.

The adjustment unit 604 is configured for adjusting the common voltage of the first plate of each of the liquid crystal capacitor within the display area to be the target voltage.

Figure 8:
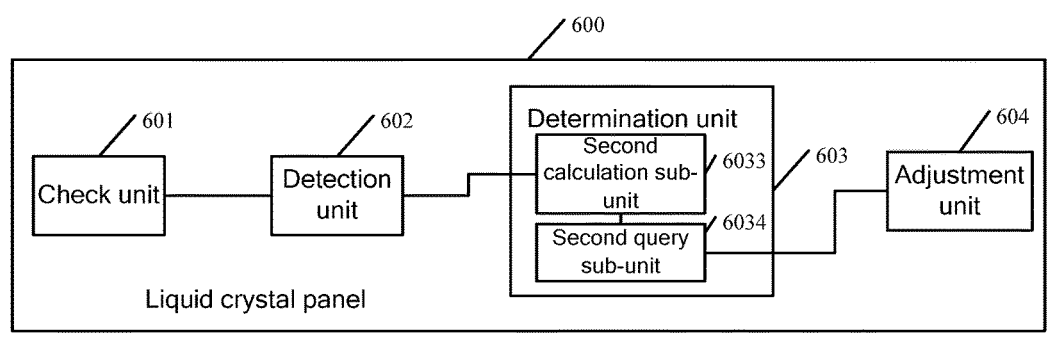
FIG. 8 is a schematic view of the liquid crystal panel in accordance with another embodiment.

FIG. 8 is a schematic view of the liquid crystal panel in accordance with another embodiment. The liquid crystal panel of FIG. 8 is enhanced on the basis of the liquid crystal panel of FIG. 6. Compared to the liquid crystal panel in FIG. 6, the liquid crystal panel in FIG. 8 further comprises a determination unit 603.

A second calculation sub-unit 6033 is configured for summing up the detected leakage current and to obtain the average leakage current.

A second query sub-unit 6034 is configured for querying the target voltage corresponding to the average leakage current in accordance with of the average leakage current and the relationship between the leakage current and the voltage.

In the embodiment, the relationship between the leakage current and the voltage is pre-saved in the liquid crystal panel, and the relationship may be obtained by experiments. The detection unit 602 detects the leakage current from each of the TFTs, and the second calculation sub-unit 6033 calculates the average value with respect to the detected leakage current. Further, the second query sub-unit 6034 may obtain the target voltage corresponding to the average leakage current in accordance with the average leakage current and the pre-saved relationship between the leakage current and the voltage.

The adjustment unit 604 is configured for adjusting the common voltage of the first plate of each of the liquid crystal capacitor within the display area to be the target voltage.

Figure 9:
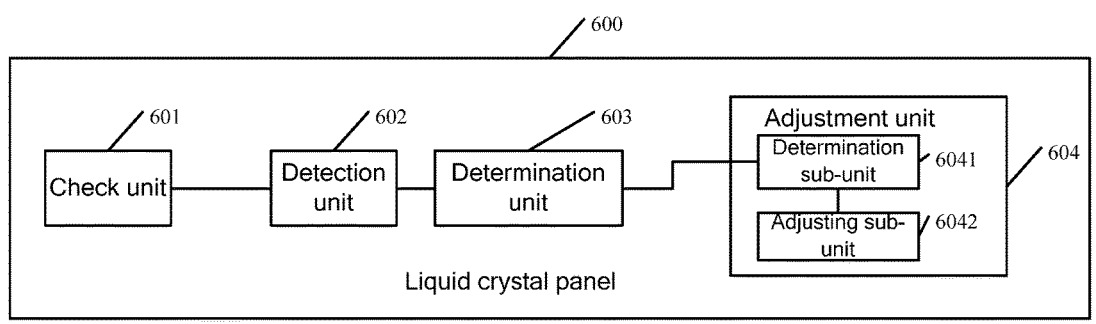
FIG. 9 is a schematic view of the liquid crystal panel in accordance with another embodiment.

FIG. 9 is a schematic view of the liquid crystal panel in accordance with another embodiment. The liquid crystal panel of FIG. 9 is enhanced on the basis of the liquid crystal panel of FIG. 6. Compared to the liquid crystal panel in FIG. 6, the liquid crystal panel in FIG. 9 further comprises a determination sub-unit 6041 and an adjusting sub-unit 6042.

The determination unit 603 is configured for determining the target voltage corresponding to each of the leakage current in accordance with the leakage current and the relationship between the leakage current and the voltage.

In the embodiment, the relationship between the leakage current and the voltage is pre-saved in the liquid crystal panel, and the relationship may be obtained by experiments. The detection unit 602 detects the leakage current from the TFTs, the determination unit 603 obtains the target voltages corresponding to each of the leakage current in view of the relationship between the leakage current and the voltage. The determination sub-unit 6041 determines the target voltages corresponding to each of the sub-areas in accordance with the relationship between the sub-areas and the TFTs. The target voltage of the sub-areas is the target voltage corresponding to the leakage current from the TFT corresponding to the sub-area.

In the embodiment, the display area of the liquid crystal panel is divided into a plurality of sub-areas. For instance, when the number of the TFTs within the non-display area is six, the display area may be divided into six sub-areas, 12 sub-areas, or 18 sub-areas, and the present disclosure is not limited thereto. Afterward, the relationship between each of the sub-areas and the TFTs may be created, and the relationship may be stored within the source IC of the liquid crystal panel.

In the embodiment, the determination unit 603 determines the target voltage corresponding to the leakage current from the TFTs. The determination sub-unit 6041 determines the target voltages corresponding to each of the sub-areas in accordance with the relationship between the sub-areas and the TFTs. The target voltage of the sub-areas is the target voltage corresponding to the leakage current from the TFT corresponding to the sub-area.

The adjusting sub-unit 6042 adjusts the common voltage of the first plate of the liquid crystal capacitor within each of the sub-areas to be the target voltage of the sub-area.

In the embodiment, the determination sub-unit 6041 determines the target voltage corresponding to each of the sub-areas, and the adjusting sub-unit 6042 adjusts the target voltage of the sub-areas to be the common voltage of the first plate of the liquid crystal capacitor within each of the sub-areas.

In view of the liquid crystal panel 600 in FIGS. 6-9, the check unit 601 is configured for determining whether the TFTs within the non-display area are turned off. If yes, the detection unit 602 detects the leakage current from each of the TFTs. Further, the determination unit 603 determines the target voltage in accordance with the detected leakage current. The adjustment unit 604 adjusts the common voltage of the first plate of the liquid crystal capacitor within the display area to be the target voltage. In this way, the difference between the two plates of the liquid crystal capacitor remains the same. When the liquid crystal molecules switch continuously between the positive and negative pole, the difference between the common voltage of the first plate of the liquid crystal capacitor and the pixel voltage of the second plate remains the same, such that the liquid crystal molecules are electrically neutrality. The ions are prevented from being captured, and thus the residuals issues may be avoided.

It is understandable in practical to the person who is skilled in the art that all or portion of the processes in the method according to the aforesaid embodiment can be accomplished with the computer program to instruct the related hardwares. The program can be stored in a readable storage medium if the computer. As the program is executed, the processes of the embodiments in the aforesaid respective methods can be included. The storage medium can be a hardisk, an optical disc, a Read-Only Memory (ROM) or a Random Access Memory (RAM).

Above are embodiments of the present invention, which does not limit the scope of the present invention. Any modifications, equivalent replacements or improvements within the spirit and principles of the embodiment described above should be covered by the protected scope of the invention.

What is claimed is:

1. A liquid crystal panel, comprising:
a display area and a non-display area, wherein:
the display area comprises a plurality of thin film transistors (TFTs) for driving the sub-pixels connected with the TFTs to display images;
the non-display area is an area having a predetermined dimension configured along a rim of the display area, the non-display area comprises a predetermined number of TFTs, a predetermined number of data lines along a vertical direction, a target gate line extending from at least one gate line within the display area along a horizontal direction, wherein each of the data lines connects to one TFT within the non-display area, each of the target gate line connects to at least one TFT within the non-display area, each of the data lines is configured for detecting leakage current of the TFTs within the non-display area connected with the data line, the detected leakage current represents characteristics of the leakage current of the TFTs within the display area, structures of the TFTs within the non-display area are the same with the structures of the TFTs within the display area, and each of the TFTs within the non-display area connects to one sub-pixel.

2. The liquid crystal panel as claimed in claim 1, wherein the data lines within the non-display area are configured for filling the voltage when the TFT within the non-display area connected with the data line is turned on, and for detecting the change of the leakage current when the TFT within the non-display area connected with the data line is turned off, and wherein the leakage current is the leakage current flowed out when the TFT within the non-display area connected with the data line is turned off.

3. The liquid crystal panel as claimed in claim 2, wherein the liquid crystal panel comprises equivalent circuits of the sub-pixels, the equivalent circuits of each of the sub-pixels are the same, and the equivalent circuit comprises at least one TFT, a liquid crystal capacitor and a storage capacitor, wherein:
gates of the TFTs within the non-display area and the display area connect to the gate line, sources of the TFTs within the non-display area and the display area connect to the data line, and drains of the TFTs within the non-display area and the display area connects to a first plate of the liquid crystal capacitor, the drains of the TFTs within the non-display area and the display area connect to a first plate of the storage capacitor, and second plates of the liquid crystal capacitor and of the storage capacitor are respectively connects to the common electrode.

4. The liquid crystal panel as claimed in claim 1, wherein when a resolution of the display area is n*m, the display area is divided into 3n*m sub-areas defined by 3n number of data lines along the vertical direction and m number of gate lines along the horizontal direction, wherein each of the sub-area comprises one sub-pixel, the display area comprises a plurality of TFTs connected by the data lines and connected by the gate lines.

5. The liquid crystal panel as claimed in claim 4, wherein the liquid crystal panel comprises equivalent circuits of the sub-pixels, the equivalent circuits of each of the sub-pixels are the same, and the equivalent circuit comprises at least one TFT, a liquid crystal capacitor and a storage capacitor, wherein:
gates of the TFTs within the non-display area and the display area connect to the gate line, sources of the TFTs within the non-display area and the display area connect to the data line, and drains of the TFTs within the non-display area and the display area connects to a first plate of the liquid crystal capacitor, the drains of the TFTs within the non-display area and the display area connect to a first plate of the storage capacitor, and second plates of the liquid crystal capacitor and of the storage capacitor are respectively connects to the common electrode.

6. The liquid crystal panel as claimed in claim 1, wherein the liquid crystal panel comprises equivalent circuits of the sub-pixels, the equivalent circuits of each of the sub-pixels are the same, and the equivalent circuit comprises at least one TFT, a liquid crystal capacitor and a storage capacitor, wherein:
gates of the TFTs within the non-display area and the display area connect to the gate line, sources of the TFTs within the non-display area and the display area connect to the data line, and drains of the TFTs within the non-display area and the display area connects to a first plate of the liquid crystal capacitor, the drains of the TFTs within the non-display area and the display area connect to a first plate of the storage capacitor, and second plates of the liquid crystal capacitor and of the storage capacitor are respectively connects to the common electrode.

7. A voltage adjusting method for liquid crystal panels, comprising:
detecting whether TFTs within a display area are turned off;
detecting leakage current from each of the TFTs upon determining the TFTs are turned off;
determining a target voltage in accordance with the detected leakage current; and
adjusting a common voltage of a first plate of a liquid crystal capacitor within the display area to be the target voltage.

8. The method as claimed in claim 7, wherein the step of determining the target voltage in accordance with the detected leakage current further comprises:
querying the voltages corresponding to each of the leakage current in accordance with the detected leakage current and a pre-saved relationship between the leakage current and the voltage; and
summing up the voltages and calculating an average voltage to be the target voltage.

9. The method as claimed in claim 8, wherein the step of adjusting the common voltage of the first plate of the liquid crystal capacitor within the display area to be the target voltage further comprises:
adjusting the common voltage of the first plate of each of the liquid crystal capacitor within the display area to be the target voltage.

10. The method as claimed in claim 7, wherein the step of determining the target voltage in accordance with the detected leakage current further comprises:
summing up the detected leakage current and calculating an average leakage current; and
querying the target voltage corresponding to each of the average leakage current in accordance with the average leakage current and a pre-saved relationship between the leakage current and the voltage.

11. The method as claimed in claim 10, wherein the step of adjusting the common voltage of the first plate of the liquid crystal capacitor within the display area to be the target voltage further comprises:
adjusting the common voltage of the first plate of each of the liquid crystal capacitor within the display area to be the target voltage.

12. The method as claimed in claim 7, wherein the step of determining a target voltage in accordance with the detected leakage current further comprises:
querying the target voltage corresponding to each of the leakage current in accordance with the detected leakage current and a pre-saved relationship between the leakage current and the voltage;
the step of adjusting the common voltage of the first plate of each of the liquid crystal capacitor within the display area to be the target voltage further comprises:
determining the target voltage corresponding to each of the sub-areas of the display area in accordance with a pre-saved relationship between the sub-areas and the TFTs, wherein the target voltage of the sub-areas is the target voltage corresponding to the leakage current from the TFT corresponding to the sub-area; and
adjusting the common voltage of the first plate of each of the liquid crystal capacitor within the display area to be the target voltage of the sub-area.

* * * * *